United States Patent
Rud (10) Patent No.: US 11,073,429 B2
(45) Date of Patent: Jul. 27, 2021

(54) NON-INVASIVE PROCESS FLUID TEMPERATURE INDICATION FOR HIGH TEMPERATURE APPLICATIONS

(71) Applicant: Rosemount Inc., Shakopee, MN (US)

(72) Inventor: Jason H. Rud, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 313 days.

(21) Appl. No.: 16/139,341

(22) Filed: Sep. 24, 2018

(65) Prior Publication Data

US 2020/0096397 A1    Mar. 26, 2020

(51) Int. Cl.
  *G01K 7/16* (2006.01)
  *G01K 7/02* (2021.01)
  *G01K 3/00* (2006.01)

(52) U.S. Cl.
  CPC .............. *G01K 7/16* (2013.01); *G01K 3/005* (2013.01); *G01K 7/02* (2013.01)

(58) Field of Classification Search
  CPC ............ G01K 7/16; G01K 3/005; G01K 7/02
  See application file for complete search history.

(56) References Cited

U.S. PATENT DOCUMENTS

| | | | |
|---|---|---|---|
| 7,165,883 B2 | 1/2007 | Nimbergger et al. | |
| 7,748,267 B2 * | 7/2010 | Olin | G01F 1/692 73/204.22 |
| 9,360,377 B2 | 6/2016 | Converse | |
| 10,317,295 B2 | 6/2019 | Rud et al. | |
| 2004/0101030 A1 | 5/2004 | Trapasso et al. | |

(Continued)

FOREIGN PATENT DOCUMENTS

CN    101571428 A    11/2009

OTHER PUBLICATIONS

Application and Drawings for U.S. Appl. No. 16/139,319, filed Sep. 24, 2018, 20 pages.

(Continued)

*Primary Examiner* — Nathaniel T Woodward
*Assistant Examiner* — Philip L Cotey
(74) *Attorney, Agent, or Firm* — Christopher R. Christenson; Kelly, Holt & Christenson PLLC (57) ABSTRACT

A process fluid temperature estimation system includes a mounting assembly that is configured to mount the process fluid temperature estimation system to an external surface of a process fluid conduit. A sensor capsule has at least one temperature sensitive element disposed therein. Measurement circuitry is coupled to the sensor capsule and is configured to detect a characteristic of the at least one temperature sensitive element that varies with temperature and provide sensor capsule temperature information. A high temperature spacer has a known thermal conductivity and is configured to be interposed between the external surface of the process fluid conduit and the at least one temperature sensitive element. A controller is coupled to the measurement circuitry and is configured to obtain a reference temperature and employ a heat transfer calculation with the reference temperature, the sensor capsule temperature information and the known thermal conductivity of the high temperature spacer to generate an estimated process fluid temperature output.

21 Claims, 8 Drawing Sheets

(56) References Cited

U.S. PATENT DOCUMENTS

| | | | |
|---|---|---|---|
| 2005/0038172 A1* | 2/2005 | Nimberger | G01F 1/36 |
| | | | 524/495 |
| 2005/0223828 A1* | 10/2005 | Olin | G01F 1/6842 |
| | | | 73/866.5 |
| 2009/0260431 A1* | 10/2009 | Olin | G01F 1/684 |
| | | | 73/204.22 |
| 2015/0185085 A1 | 7/2015 | Converse | |
| 2017/0059498 A1* | 3/2017 | Yeh | G01K 3/10 |
| 2017/0212065 A1 | 7/2017 | Rud et al. | |
| 2018/0003655 A1* | 1/2018 | Rud | G01K 1/08 |
| 2019/0277711 A1 | 9/2019 | Rud | |
| 2019/0293241 A1 | 9/2019 | Rud et al. | |

OTHER PUBLICATIONS

Application and Drawings for U.S. Appl. No. 16/146,152, filed Sep. 28, 2018, 16 pages.

Application and Drawings for U.S. Appl. No. 16/296,521, filed Mar. 8, 2019, 27 pages.

International Search Report and Written Opinion for International Patent Application No. PCT/US2019/051911, dated Jan. 3, 2020, date of filing: Sep. 19, 2019, 14 pages.

First Chinese Office Action dated Nov. 2, 2020 for Chinese Patent Application No. 201910231388.9, 21 pages including English translation.

Second Chinese Office,Action dated Apr. 19, 2021 for Chinese Patent Application No. 201910231388.9, 22 pages including English translation.

* cited by examiner

NON-INVASIVE PROCESS FLUID TEMPERATURE INDICATION FOR HIGH TEMPERATURE APPLICATIONS

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

It is common to place a temperature sensor within a thermowell, which is then inserted into the process fluid flow through an aperture in the conduit. However, this approach may not always be practical in that the process fluid may have a very high temperature, be very corrosive, or both. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number of limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit. In some instances, however, the external surface temperature of the conduit may be beyond the normal operating range of the temperature sensor(s). Thus, there is a need to extend the number of applications to which non-invasive process fluid temperature estimation techniques can be applied.

SUMMARY

A process fluid temperature estimation system includes a mounting assembly that is configured to mount the process fluid temperature estimation system to an external surface of a process fluid conduit. A sensor capsule has at least one temperature sensitive element disposed therein. Measurement circuitry is coupled to the sensor capsule and is configured to detect a characteristic of the at least one temperature sensitive element that varies with temperature and provide sensor capsule temperature information. A high temperature spacer has a known thermal conductivity and is configured to be interposed between the external surface of the process fluid conduit and the at least one temperature sensitive element. A controller is coupled to the measurement circuitry and is configured to obtain a reference temperature and employ a heat transfer calculation with the reference temperature, the sensor capsule temperature information and the known thermal conductivity of the high temperature spacer to generate an estimated process fluid temperature output.

DETAILED DESCRIPTION

As set forth above, process fluid temperature has been estimated by measuring an external temperature of a process fluid conduit, such as a pipe, and employing a heat flow calculation. Such systems generally use the pipe skin (external surface) temperature $T_{skin}$ and a reference temperature, such as a transmitter terminal temperature, and thermal impedance values in the heat flow calculation to infer or otherwise estimate the process fluid temperature within the conduit. This feature generally requires the thermal conductivity to be known from the process fluid to the transmitter terminals thus requiring the sensor to generally be connected to the process fluid temperature transmitter. While some heat flux sensors may be available for high temperature applications that use thermocouple technology, it has been found that resistance temperature device (RTD) elements generally provide higher accuracy and precision than thermocouple technology, but present a trade off in a relatively limited temperature range. In an ideal situation, the pipe skin temperature is measured by a temperature sensitive element placed as close as possible to the external pipe surface. This close coupling allows for improved sensitivity to process fluid temperature changes by reducing time constants resulting from minimal thermal impedance between the temperature sensitive element and the process fluid.

While RTD temperature elements in heat flux based calculation systems provide good stability and accuracy compared to thermocouples, their thermal operating range can be limited. In particular, heat flux based sensors that use RTDs based on thin film RTD technology provide acceptable stability and accuracy as compared to thermocouples. Further, the RTD sensor capsule construction can also contain materials that allow for improved thermal conduction from the sensor tip to the sensor element. These materials generally require the operating range of the sensor capsule to be less than approximately 300 degrees Celsius. However, it is believed that there is a need to provide RTD-based heat flux sensor technology to applications extending up to and including 650 degrees Celsius, which vastly exceeds the operating temperature range of thin film RTD technology. For example, coker exhaust pipes can operate at temperatures at about 600 degrees Celsius. In this example, the velocity of the material is so great that is can cut thermowells when positioned in an elbow. Such configurations require preventative maintenance to inspect and replace thermowells. If a heat flux based non-invasive approach could be extended to this application, the preventative maintenance to inspect and replace the thermowells could be eliminated since no structure would extend into the coker exhaust pipes.

Embodiments described herein generally leverage the advantageous stability and accuracy of thin film RTD technology in a way that extends the range of applications to which non-invasive process fluid measurement can be provided. Generally, a spacer or insert having a known thermal conductivity separates a temperature sensor capsule from the external surface of the process fluid conduit. This spacer or insert has a first surface (hot-side) that directly contacts the external surface of the process fluid conduit. The spacer or insert also has an opposite surface (cold-side) that is spaced from the external surface of the process fluid conduit by a known distance and through a material having a known thermal conductivity. In this way, a temperature measurement of the cold-side or of the insert can be used to provide an accurate and reliable indication of the process fluid temperature in heat flux-based non-invasive applications. Further, since the temperature measurement is measured at the cold-side, the temperature measured is less than that of the surface of the external conduit. Thus, while the temperature of the external conduit may be quite high, such as at or above 650 degrees Celsius, the cold-side temperature may be kept in an operating range of advantageous thin-film RTD based sensors, such as 300 degrees Celsius. The cold-side temperature measurement is then employed in addition to a reference temperature and the thermal conductivity of the spacer/insert in a heat flux calculation to provide an estimation of process fluid temperature, as will be described in greater detail below.

Figure 1:
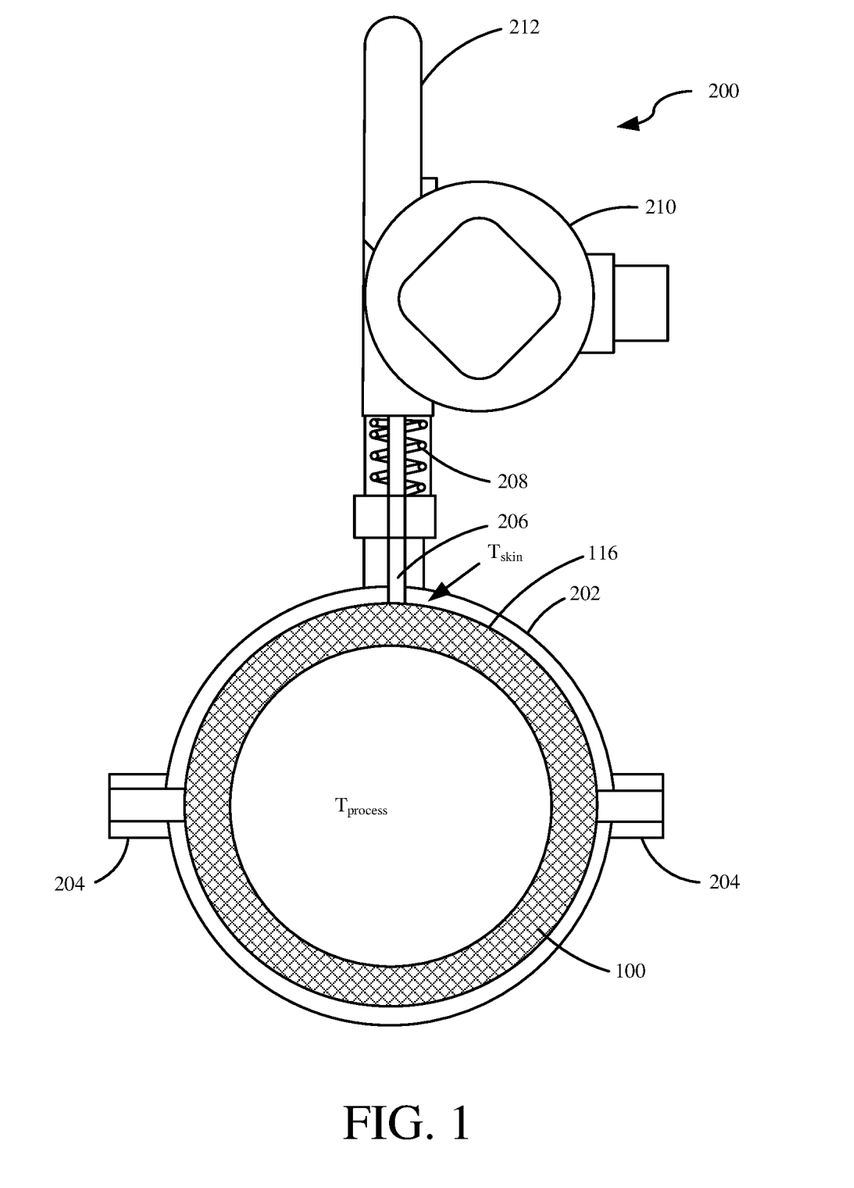
FIG. 1 is a diagrammatic view of a heat flow measurement system with which embodiments of the present invention are particularly applicable.

FIG. 1 is a diagrammatic view of a heat flow measurement system with which embodiments of the present invention are particularly applicable. As illustrated, system 200 generally includes a pipe clamp portion 202 that is configured to clamp around conduit or pipe 100. Pipe clamp 202 may have one or more clamp ears 204 in order to allow the clamp portion 202 to be positioned and clamped to pipe 100. Pipe clamp 202 may replace one of clamp ears 204 with a hinge portion such that pipe clamp 202 can be opened to be positioned on a pipe and then closed and secured by clamp ear 204. While the clamp illustrated with respect to FIG. 1 is particularly useful, any suitable mechanical arrangement for securely positioning system 200 about an exterior surface of a pipe can be used in accordance with embodiments described herein.

System 200 includes heat flow sensor capsule 206 that is urged against external diameter 116 of pipe 100 by spring 208. The term "capsule" is not intended to imply any particular structure or shape and can thus be formed in a variety of shapes, sizes and configurations. While spring 208 is illustrated, those skilled in the art will appreciate that various techniques can be used to urge sensor capsule 206 into continuous contact with external diameter 116. Sensor capsule 206 generally includes one or more temperature sensitive elements, such as resistance temperature devices (RTDs). Sensors within capsule 206 are electrically connected to transmitter circuitry within housing 210, which is configured to obtain one or more temperature measurements from sensor capsule 206 and calculate an estimate of the process fluid temperature based on the measurements from sensor capsule 206, and a reference temperature, such as a temperature measured within housing 210, or otherwise provided to circuitry within housing 210.

In one example, the basic heat flow calculation can be simplified into:

$$T_{corrected} = T_{skin} + (T_{skin} - T_{reference}) * (R_{pipe}/R_{sensor}).$$

In this equation, $T_{skin}$ is the measured temperature of the external surface of the conduit. Additionally, $T_{reference}$ is a second temperature obtained relative to a location having a fixed thermal impedance ($R_{sensor}$) from the temperature sensor that measures $T_{skin}$. $R_{pipe}$ is the thermal impedance of the conduit and can be obtained manually by obtaining pipe material information, pipe wall thickness information. Additionally, or alternately, a parameter related to $R_{pipe}$ can be determined during a calibration and stored for subsequent use. Accordingly, using a suitable heat flux calculation, such as that described above, circuitry within housing 210 is able to calculate an estimate for the process fluid temperature ($T_{corrected}$) and convey an indication regarding such process fluid temperature to suitable devices and/or a control room.

Figure 2:
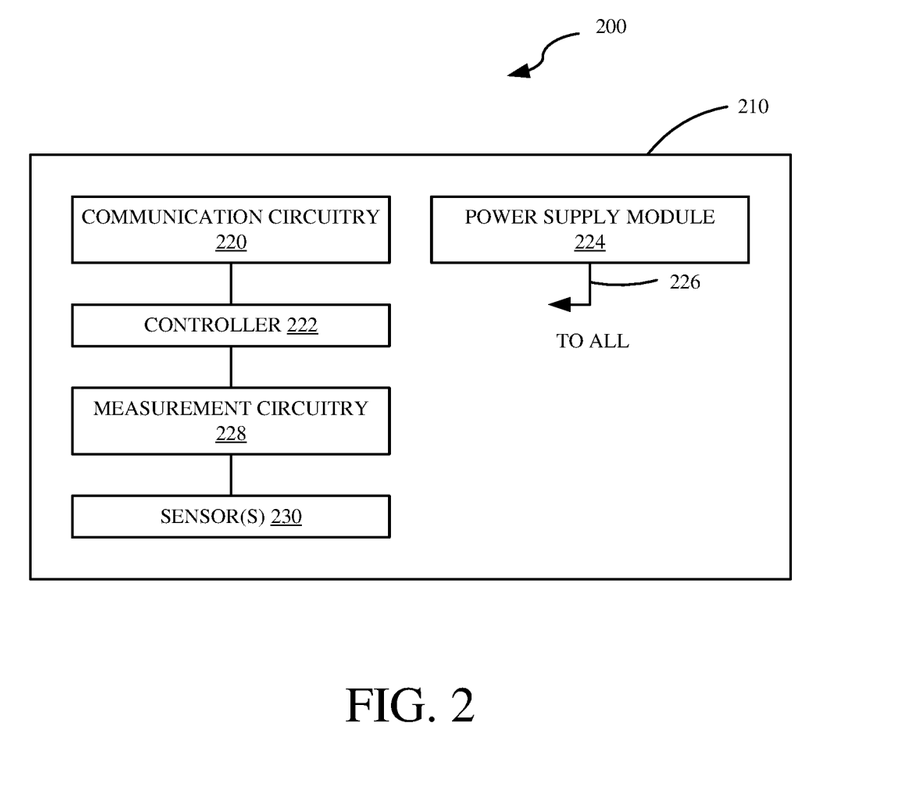
FIG. 2 is a block diagram of circuitry within a heat flow measurement system, within a heat flow measurement system, with which embodiments of the present invention are particularly applicable.

FIG. 2 is a block diagram of circuitry within housing 210 of heat flow measurement system 200, with which embodiments of the present invention are particularly applicable. System 200 includes communication circuitry 220 coupled to controller 222. Communication circuitry 220 can be any suitable circuitry that is able to convey information regarding the estimated process fluid temperature. Communication circuitry 220 allows heat flow measurement system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

Heat flow measurement system 200 also includes power supply module 224 that provides power to all components of system 200 as indicated by arrow 226. In embodiments where heat flow measurement system 200 is coupled to a wired process communication loop, such as a HART® loop, or a FOUNDATION™ Fieldbus segment, power module 224 may include suitable circuitry to condition power received from the loop or segment to operate the various components of system 200. Accordingly, in such a wired process communication loop embodiments, power supply module 224 may provide suitable power conditioning to allow the entire device to be powered by the loop to which it is coupled. In other embodiments, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210. In one example, controller 222 is a microprocessor. Controller 222 is communicatively coupled to communication circuitry 220.

Measurement circuitry 228 is coupled to controller 222 and provides digital indications with respect to measurements obtained from one or more temperature sensors 230. Measurement circuitry 228 can include one or more analog-to-digital converters and/or suitable multi-plexing circuitry to interface the one or more analog-to-digital converters to sensors 230. Additionally, measurement circuitry 228 can include suitable amplification and/or linearization circuitry as may be appropriate for the various types of temperature sensors employed.

Figure 3:
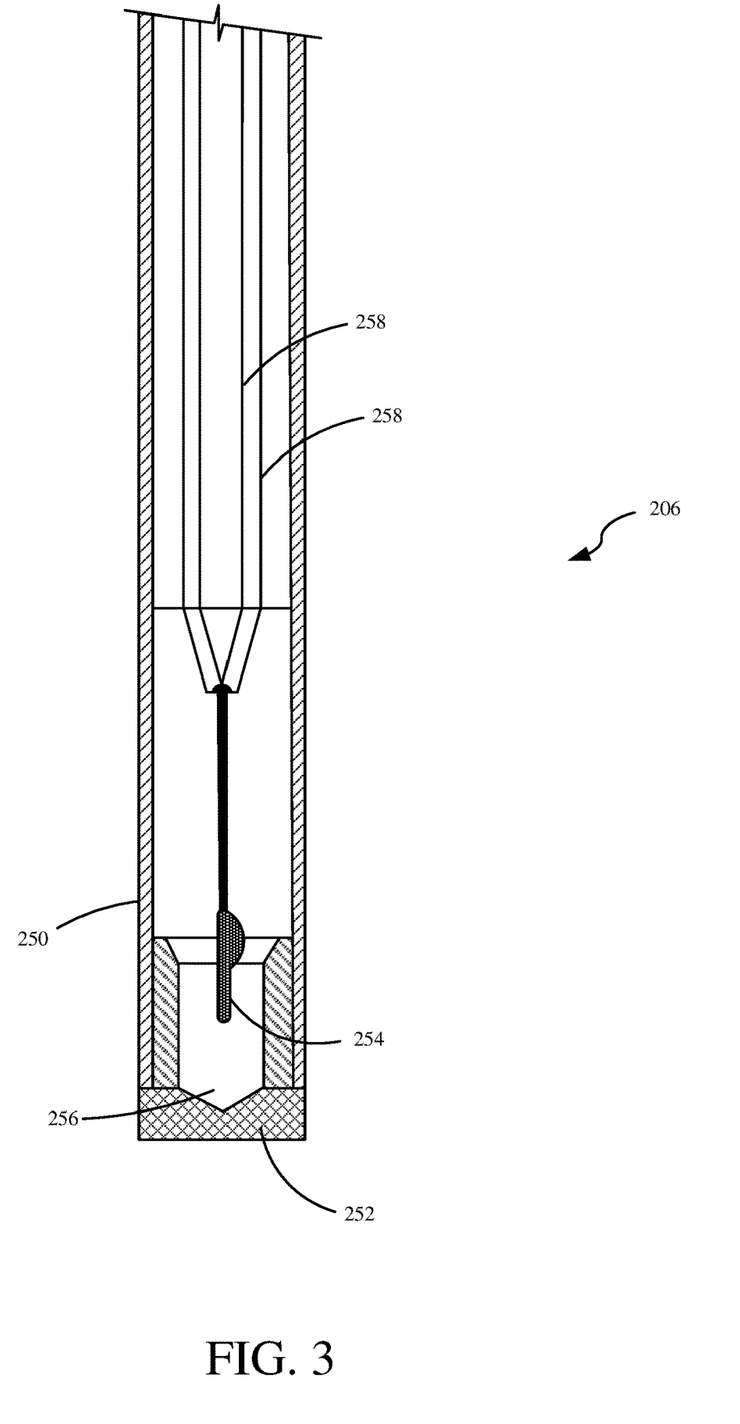
FIG. 3 is a diagrammatic cross sectional view of a sensor capsule with which embodiments of the present invention are particularly applicable.

FIG. 3 is a diagrammatic view of a sensor capsule with which embodiments of the present invention are particularly applicable. Sensor capsule 206 generally includes a cylindrical side wall 250 with an endcap 252 coupled thereto. In one example, endcap 252 is formed of silver. One or more RTD elements 254 are disposed proximate endcap 252 and are provided in thermal communication with endcap 252 via thermal grease 256. Conductors 258 electrically couple RTD element(s) 254 to measurement circuitry within housing 210. In one embodiment, element 254 is formed in accordance with thin-film RTD technology. Thin-film RTDs are generally considered to be very rugged and generally low cost. A thin-film element is typically manufactured by coating a small ceramic chip with a very thin (such as 0.0001 inch) film of a temperature-sensitive metal (such as platinum) and then laser cutting or chemical or chemical etching as resistance path in the metal film.

Figure 4:
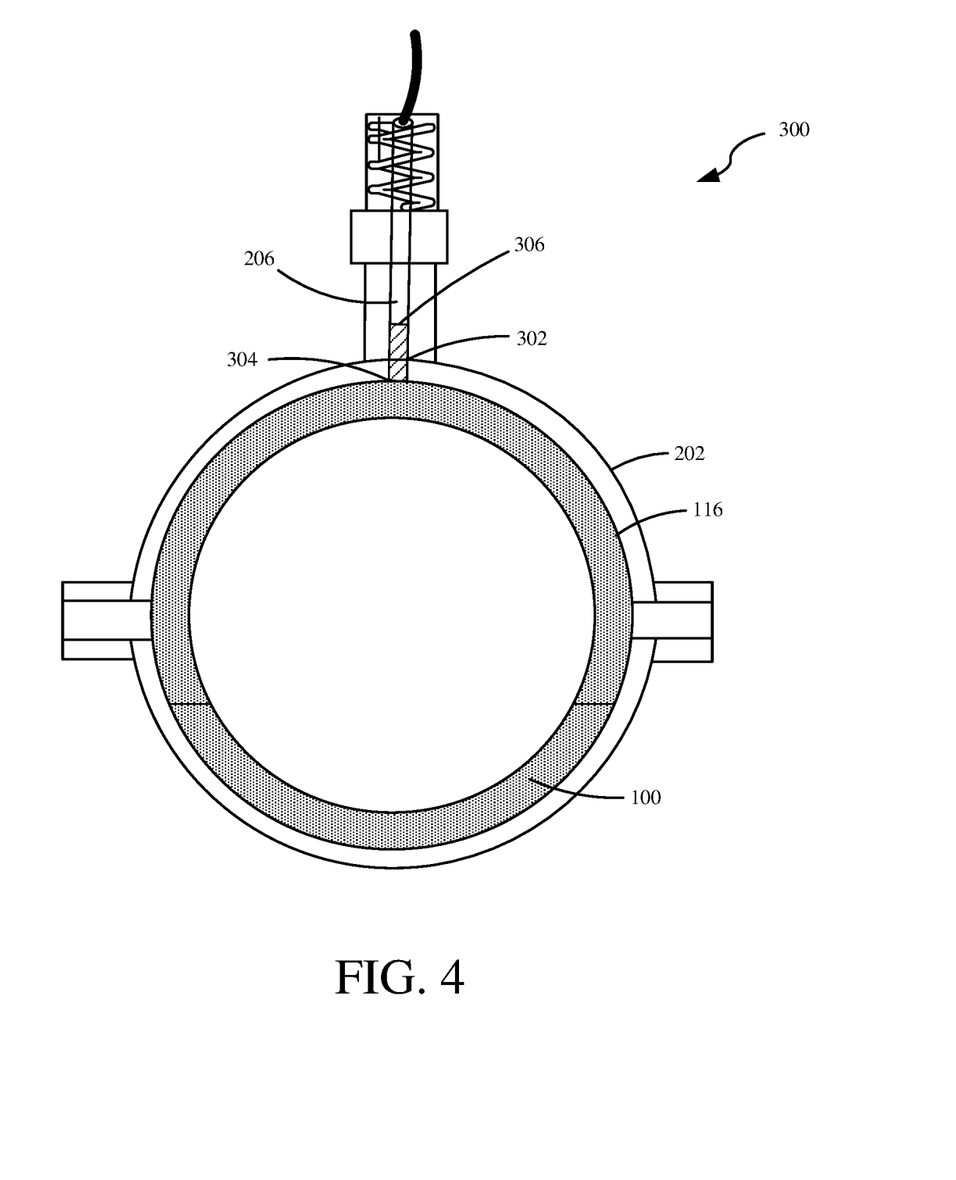
FIG. 4 is a diagrammatic view of a high temperature heat flow measurement system in accordance with an embodiment of the present invention.

FIG. 4 is a diagrammatic view of a heat flux-based process fluid temperature estimation system for high temperature applications in accordance with an embodiment of the present invention. System 300 is shown employing sensor capsule 206, described above with respect to FIG. 3 that is urged against high temperature insert 302. Insert 302 passes through an aperture in pipe clamp 202 and has a hot-side 304 that contacts external diameter 116 of pipe 100. Sensor capsule 206 bears against and contacts cold side 306 of high temperature insert 302. As heat flows from conduit 100 through high temperature insert 302, a temperature gradient will be formed between hot side 304 and cold side 306. With a given, known, thermal conductivity of high temperature insert 302, the temperature of cold side 306 is precisely related to the temperature of hot side 304.

The basic heat flow equation set forth above is modified to include the gradient generated across insert 302 where $T_{botEnd}$ is the hot end of the sensor capsule measuring the cold side 306 of insert 302 as follows:

$$T_{corrected} = (T_{botEnd} + (T_{botEnd} - T_{reference})((R_{pipe} + R_{stand-off})/R_{sensor}))$$

Sensor capsule 206 could sit on or be crimped to high temperature insert 302 that is used to conduct heat from the hot process fluid conduit 100 to the tip of sensor capsule 206. The insert could be made of one or more materials selected to provide different levels of thermal impedance for extremely hot surfaces.

Figure 5:
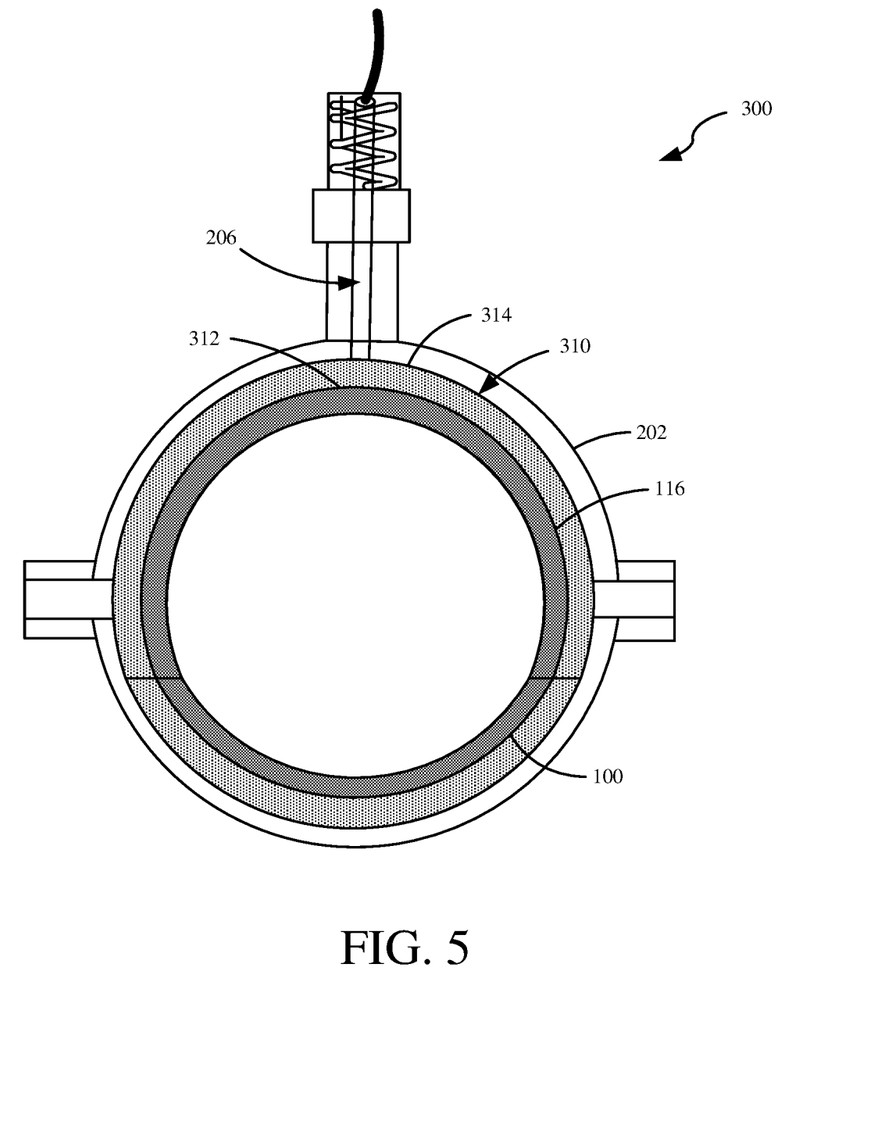
FIG. 5 is a diagrammatic view of high temperature heat flow measurement system in accordance of another embodiment of the present invention.

FIG. 5 is a diagrammatic view of a non-invasive process fluid measurement system for high temperature applications in accordance with another embodiment of the present invention. FIG. 5 bears many similarities to the embodiment shown in FIG. 4, and like components are numbered similarly. The main difference between the embodiment shown in FIG. 5 and that of FIG. 4 is that high temperature insert 306 has been removed, and instead, RTD sensor capsule 206 bears against a conduit sleeve 310 that extends partially, or completely about conduit 100. Like high temperature insert 306, however, conduit sleeve 310 includes a high-temperature side 312 that bears directly against external diameter 116 of conduit 100. Conduit sleeve 310 also includes cold side 314 that is separated from hot side 312. The thermal conductivity and thickness of conduit sleeve 310 are known, or otherwise obtained, and thus the temperature of cold side 314 is precisely related to the temperature of hot side 312. Accordingly, measurements obtained by sensor capsule 206 can be used to precisely estimate the temperature of process fluid within conduit 100 while the actual temperature to which sensor capsule 206 is exposed is less than the temperature of external diameter 116 of process fluid conduit 100. In this way, the advantages of high accuracy, stable and good stability sensors can be extended to higher-temperature applications, such as coker exhaust pipes.

Figure 6:
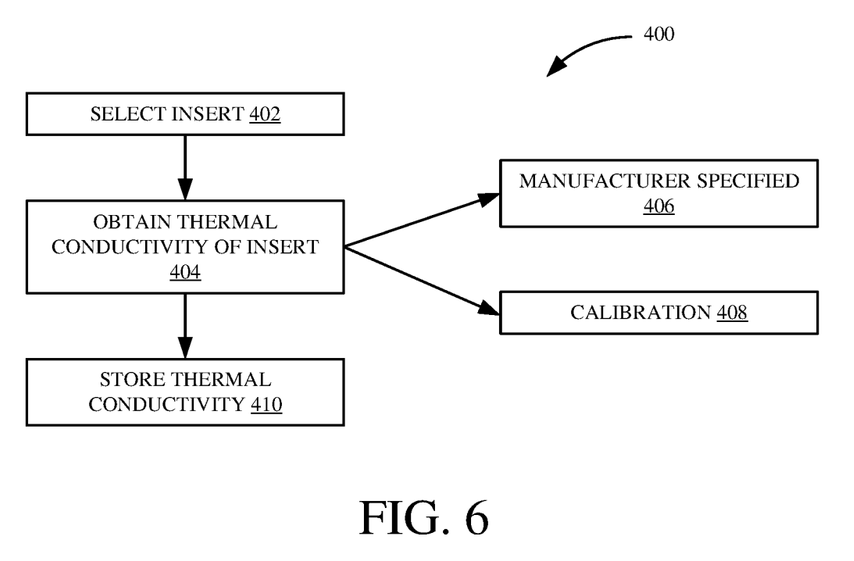
FIG. 6 is a flow diagram of a method of obtaining thermal conductivity relative to a selected high temperature insert in accordance with an embodiment of the present invention.

FIG. 6 is flow diagram of a method of obtaining and storing thermal conductivity of a high temperature insert in accordance with an embodiment of the present invention. Method 400 begins at block 402 where a particular high-temperature insert is selected. As set forth above, inserts may be formed and provided based upon a particular operating temperature to which they will be exposed. Such design considerations can include the type of material selected (such as high-temperature stainless steel, or ceramic) as well as the length and cross sectional area and/or shape of the insert. For example, a two-inch high temperature insert may allow the contact temperature (temperature of the hot side contacting the external diameter of the conduit) to be 650 degrees Celsius while the cold side (side contacting the sensor capsule) is measuring approximately 300 degrees Celsius. Once the high-temperature insert has been selected, it is necessary for the heat flow calculation to obtain the thermal conductivity of the insert. In examples where the high-temperature insert is provided by a manufacturer, this information may be provided along with the product. For example, this information may be written on product packaging or on a label of the product. These are examples of manufacturer-specified thermal conductivity as indicated at block 406. Another way thermal conductivity can me provided at block 404, is via calibration or testing 408. In such calibration, a known temperature is applied to one side (such as the hot-side) of the high-temperature insert, and the temperature is measured on the cold side. Based on the difference between the two measured temperatures and an ambient temperature, the thermal conductivity of the high-temperature insert can be calculated and then stored for the heat flow calculation. In another example, it is also contemplated that the non-invasive heat flow calculation can be calibrated by receiving an indication of a known process fluid temperature, such as via process communication, or local operator input, and then causing controller 222 to solve for or otherwise calculate the thermal conductivity based upon the measured temperature of the cold side of the high-temperature thermal insert. Additionally, in the selection of the insert, it is also expressly contemplated that the high-temperature insert may be provided of a relatively long length and may then be cut to length to allow for precise thermal conductivity to be set. Regardless, at block 410, the thermal conductivity of the high-temperature insert or spacer is stored for a later use during operation of the system.

Figure 7:
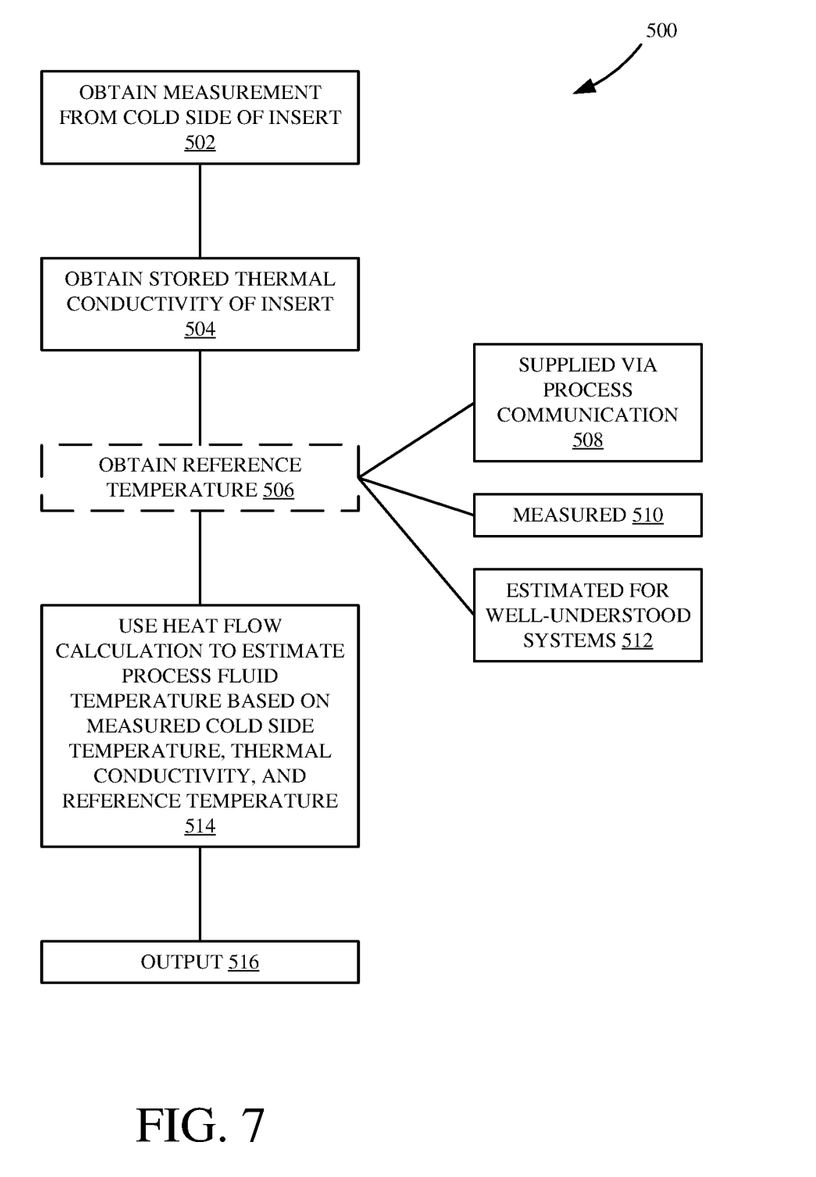
FIG. 7 is a flow diagram of a method of providing a process fluid temperature measurement in a high temperature application in accordance with an embodiment of the present invention.

FIG. 7 is a flow diagram of a method of estimating and providing a process fluid temperature based on heat flow in accordance with an embodiment to the present invention. Method 500 begins at block 502 where a temperature is measured from a cold side of a high-temperature insert. The hot side of the high-temperature insert is coupled directly to an external diameter of a process fluid conduit, such as pipe 100. Next, at block 504, a stored thermal conductivity or the high-temperature insert is obtained. This step can be preformed by accessing local memory of controller 222 of the system, or by communicating with an external device, such as a process controller, to receive information indicative of the thermal conductivity of the high-temperature insert. Next, at optional block 506, a referenced temperature is obtained. In one embodiment this reference temperature may be obtained in a variety of ways. For example, the reference temperature may be obtained via receiving process communication indicating the reference temperature, as indicated at block 508. Alternately, at block 510, the reference temperature is measured by the system. In one example, this measurement is a temperature measurement at a location within housing 210, such as at a terminal block. However, the measurement can be obtained from any location having a relatively fixed thermal relationship with respect to external diameter 116 of process fluid conduit 100. Via this fixed thermal arrangement, the flow of heat from the process fluid conduit to the reference temperature location is fixed and thus follows the heat flow calculation described above. Finally, for applications with relatively well-understood thermal systems, the reference temperature may be estimated as indicated at block 512. For example, if the process fluid conduit is located within a climate-controlled interior of a facility, the nominal temperature of the climate (such as 70 degrees Fahrenheit) can be used for the estimated reference temperature.

At block 514 the measured cold side temperature of the insert, thermal conductivity of the insert, and reference temperature, are applied to a heat flow calculation, such as that set forth above, to calculate an estimate of process fluid temperature. Finally, at block 516, the estimated process fluid temperature is output. In one example, the output is communicated over a process communication loop in accordance with a process communication protocol, such as that set forth above.

Figure 8:
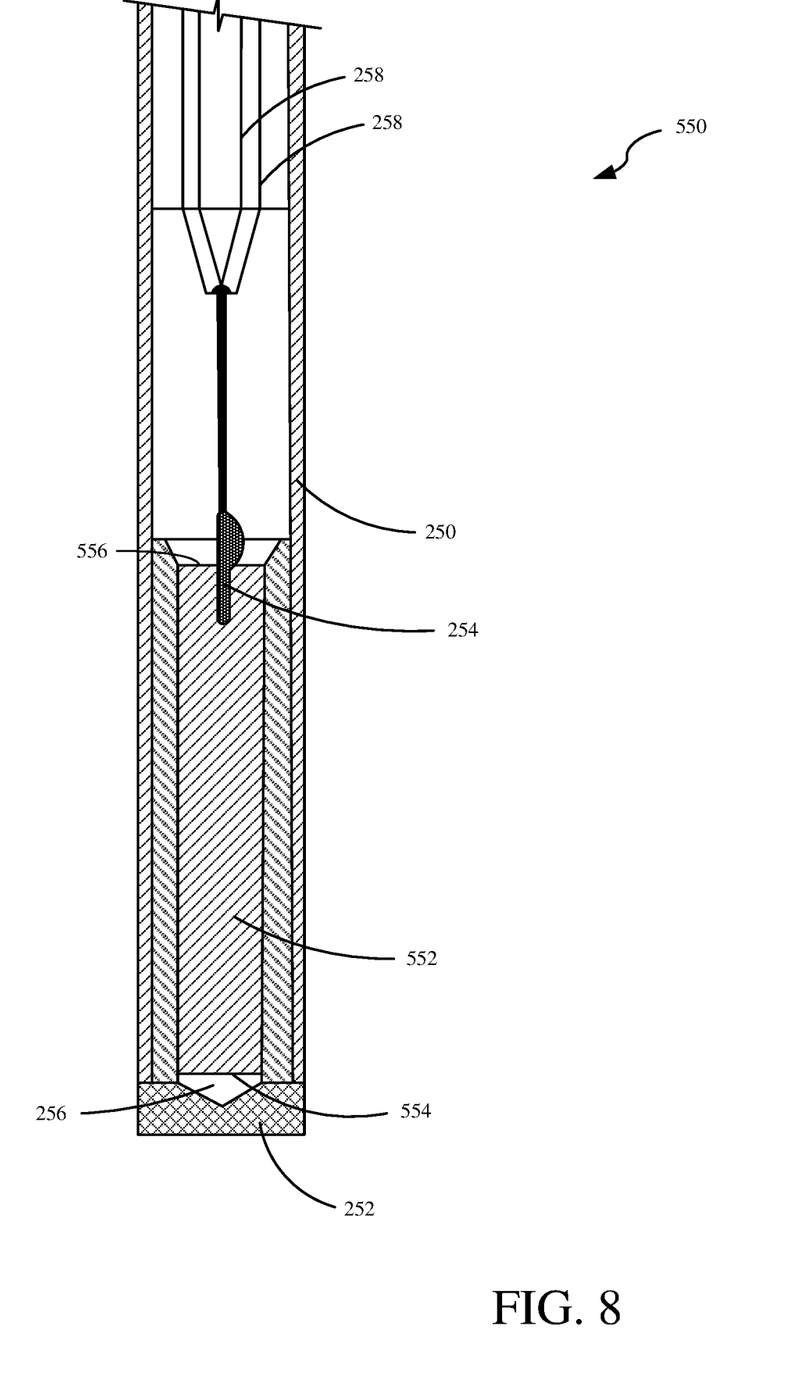
FIG. 8 is a cross sectional diagrammatic view of a sensor capsule for a high-temperature heat flux-based process fluid estimation system in accordance with an embodiment of the present invention.

FIG. 8 is a cross sectional diagrammatic view of a sensor capsule for a high-temperature heat flux-based process fluid estimation system in accordance with an embodiment of the present invention. Sensor capsule 550 bears some similarities to sensor capsule 206 (described with respect to FIG. 3) and the like components are numbered similarly. Like sensor capsule 206, sensor capsule 550 includes a cylindrical side wall 250 that is coupled to endcap 252 that may be formed of silver or stainless steel. Additionally, sensor capsule 550 also employs thin-film RTD based element 254. However, sensor capsule 550 does not have thin-film RTD element 254 disposed within thermal grease 256. Instead, a high-temperature thermal insert 552 is disposed within sensor capsule 550 and has a hot end 554 thermally coupled to end 252 via thermal grease 256. Additionally, RTD sensor 254 is disposed within or proximate cold end 556 of high-temperature insert 552. Thus, embodiment 550 is similar to the embodiment shown in FIGS. 3 and 4 except that the high temperature insert (302 shown in FIG. 4) is disposed within the sensor capsule 550 itself.

Although the present invention has been described with reference to preferred embodiments, workers skilled in the art will recognize that changes may be made in form and detail without departing from the spirit and scope of the invention. For example, while the present invention has been described with respect to a non-invasive process fluid estimation system, those skilled in the art will appreciate that certain aspects of the present invention are applicable to thermowells, which are considered to be invasive in that they extend into the conduit. For example, a high-temperature insert can be placed within a standard thermowell and used to space a temperature sensitive element, such as an RTD or thermocouple, from a surface of the thermowell body. Providing such a material interposed between a temperature sensitive element and the thermowell is generally contra to standard thermowell design which aims to have the temperature sensitive element in as close of thermal contact as possible to the thermowell body. The temperature measured within the thermowell, would still be applied to a correction algorithm, such as a heat flow algorithm, in order to estimate the temperature of the material contacting the thermowell. Additionally, or alternatively, the thermowell body could be made of a thermally impeding material to allow for high temperature measurements.

While embodiments of the present invention have generally been described with respect to a sensor capsule passing through the pipe clamp in order to contact a conduit sleeve, it is expressly contemplated that the pipe clamp itself could be designed as a thermally impeding material and thus need not contain a hole for the sensor capsule to pass through. Accordingly, in such an embodiment, the sensor would sit on the clamp surface and the thermal conductivity of the clamp material would form part of the heat flow calculation.

What is claimed is:

1. A process fluid temperature estimation system comprising:
   a mounting assembly configured to mount the process fluid temperature estimation system to an external surface of a process fluid conduit;
   a sensor capsule having at least one temperature sensitive element disposed therein;
   measurement circuitry coupled to the sensor capsule and configured to detect a characteristic of the at least one temperature sensitive element that varies with temperature and provide sensor capsule temperature information;
   a high temperature spacer, separate from the mounting assembly, having a known thermal conductivity and configured to be interposed between the external surface of the process fluid conduit and the at least one temperature sensitive element; and
   a controller coupled to the measurement circuitry, the controller being configured to obtain a reference temperature and employ a heat transfer calculation with the reference temperature, the sensor capsule temperature information and the known thermal conductivity of the high temperature spacer to generate an estimated process fluid temperature output.

2. The process fluid temperature estimation system of claim 1, wherein the at least one temperature sensitive element has a thermal operating limit and wherein the high temperature spacer has a first end configured to contact a surface with a surface temperature exceeding the thermal operating limit of the at least one temperature sensitive element.

3. The process fluid temperature estimation system of claim 2, wherein the thermal operating limit of the at least one temperature sensitive element is 300 degrees Celsius.

4. The process fluid temperature estimation system of claim 1, wherein the at least one temperature sensitive element is a resistance temperature device.

5. The process fluid temperature estimation system of claim 1, wherein the high temperature spacer passes through an aperture in the mounting assembly.

6. The process fluid temperature estimation system of claim 1, wherein the mounting assembly includes a pipe clamp configured to couple the process fluid temperature estimation system to the process fluid conduit.

7. The process fluid temperature estimation system of claim 6, wherein the high temperature spacer comprises a material placed between the pipe clamp and the external surface of the process fluid conduit.

8. The process fluid temperature estimation system of claim 7, wherein the sensor capsule is disposed within the aperture and contacts a surface of the material.

9. The process fluid temperature estimation system of claim 1, wherein the high temperature spacer is disposed within the sensor capsule.

10. The process fluid temperature estimation system of claim 1, and further comprising communication circuitry coupled to the controller and configured communicate in accordance with a process communication loop protocol.

11. The process fluid temperature estimation system of claim 10, wherein the communication circuitry is configured to communicate wirelessly.

12. The process fluidtemperature estimation system of claim 1, wherein the sensor capsule has an endcap, and at least one temperature sensitive element is thermally coupled to the endcap with a material selected from the group consisting of thermal grease, mineral insulated powder, and room temperature vulcanizing silicone rubber.

13. The process fluid temperature estimation system of claim 12, wherein the endcap is formed of silver.

14. The process fluid temperature estimation system of claim 1, wherein the high temperature spacer is formed of stainless steel.

15. The process fluid temperature estimation system of claim 1, wherein the high temperature spacer is formed of ceramic.

16. A method of estimating process fluid temperature within a conduit, the method comprising:
    mounting, with a mounting assembly, a process fluid temperature estimation system to the conduit:
    providing a high temperature insert having a hot side thermally coupled to an external surface of the conduit and a cold side, the high temperature insert haying a known thermal conductivity and being separate from the mounting assembly;
    measuring, with the process fluid temperature estimation system, a temperature of the cold side of the high temperature insert;
    obtaining a reference temperature; and
    using a heat flow calculation on the measured cold side temperature, reference temperature, and known thermal conductivity to estimate a temperature of process fluid within the conduit.

17. The method of claim 16, wherein the known thermal conductivity is obtained from memory of a device performing the heat flow calculation.

18. The method of claim 16, wherein obtaining the reference temperature includes measuring a temperature of a terminal block within a housing of a process fluid temperature estimation system.

19. The method of claim 16, wherein obtaining the reference temperature includes receiving process communication indicative of the reference temperature.

20. A process fluid temperature estimation system comprising:
    a thermowall configured to mount to and extend into a process fluid conduit, the thermowall having a distal end configured to contact the process fluid;
    a high temperature spacer having a known thermal conductivity and having a hot side configured to be nearer the distal end of the thermowell relative to the cold side;
    a sensor capsule having at least one temperature sensitive element disposed therein, the at least one temperature sensitive element configured to be in contact with the cold side of the high temperature spacer such that at least a portion of the high temperature spacer is configured to he interposed between the distal end of the thermowell and the at least one temperature sensitive element;
    measurement circuitry coupled to the sensor capsule and configured to detect a characteristic of the at least one temperature sensitive element that varies with temperature and provide sensor capsule temperature information; and
    a controller coupled to the measurement circuitry, the controller being configured to obtain a reference temperature and employ a heat transfer calculation with the reference temperature, the sensor capsule temperature information and the known thermal conductivity of the high temperature spacer to generate an estimated process fluid temperature output.

21. A process fluid temperature estimation system comprising:
    a mounting assembly configured to mount the process fluid temperature estimation system to a process fluid conduit;
    a sensor capsule having at least one temperature sensitive element disposed therein, the sensor capsule further comprising:
        a side wall; and
        an end cap;
    measurement circuitry coupled to the sensor capsule and configured to detect a characteristic of the at least one temperature sensitive element that varies with temperature and provide sensor capsule temperature information;
    high temperature spacer, separate from the mounting assembly, having known thermal conductivity, the high temperature spacer further comprising:
        a hot side configured to contact an external surface of the process fluid conduit; and
        a cold side configured to contact the end cap of the sensor capsule; and
    a controller coupled to the measurement circuitry, the controller being configured to obtain a reference temperature and employ a heat transfer calculation with the reference temperature, the sensor capsule temperature information and the known thermal conductivity of the high temperature spacer to generate an estimated process fluid temperature output.

* * * * *